United States Patent [19]

MacDonald et al.

[11] Patent Number: 4,883,600

[45] Date of Patent: Nov. 28, 1989

[54] STABILIZATION OF SOLUBLE MANGANESE IN AQUEOUS SYSTEMS

[75] Inventors: James R. MacDonald, Chicago; Barbara E. Fair, Downers Grove, both of Ill.

[73] Assignee: Nalco Chemical Company, Naperville, Ill.

[21] Appl. No.: 256,541

[22] Filed: Oct. 12, 1988

[51] Int. Cl.$^4$ ................................................ C02F 5/12
[52] U.S. Cl. ..................................... 210/696; 210/698; 210/754; 210/764; 252/175; 252/180
[58] Field of Search ................................. 210/698–701, 210/754, 764, 696; 252/180, 181, 175

[56] References Cited

U.S. PATENT DOCUMENTS

| | | | |
|---|---|---|---|
| 2,106,513 | 1/1938 | Allison | 210/754 |
| 3,170,883 | 2/1965 | Owen | 210/756 |
| 4,032,460 | 6/1977 | Zilch et al. | 210/698 |
| 4,552,665 | 11/1985 | Ralston et al. | 210/699 |
| 4,642,194 | 2/1987 | Johnson | 252/180 |
| 4,759,852 | 7/1988 | Trulear | 210/699 |
| 4,802,990 | 2/1989 | Inskeer | 210/699 |

Primary Examiner—Peter Hruskoci
Attorney, Agent, or Firm—Joan I. Norek; John G. Premo; Donald G. Epple

[57] ABSTRACT

The soluble manganese species can be maintained in aqueous systems in the presence of halogen species by treating the waters with certain water-soluble, nitrogen containing compositions.

7 Claims, No Drawings

STABILIZATION OF SOLUBLE MANGANESE IN AQUEOUS SYSTEMS

TECHNICAL FIELD OF THE INVENTION

The present invention is in the technical field of water treatment, and in particular the field of stabilizing soluble manganese in aqueous systems, particularly industrial aqueous systems, such as industrial cooling water systems.

BACKGROUND OF THE INVENTION

Soluble manganese may be introduced into an aqueous system in a number of ways, including its presence in the feed or makeup water or by addition to the system as a component of a corrosion inhibition treatment. Such aqueous systems may also be subject to halogenation processes to control microbiological growth. In the presence of halogen species in water, soluble manganese generally is oxidized to insoluble higher-oxidation state species, for instance $MnO_2$. This can result in discoloration of the water or staining, fouling due to manganese deposits, and in those instance where manganese is a component of a corrosion inhibition treatment, the depletion of soluble manganese available for corrosion inhibition treatment activity.

Soluble manganese is generally believed to be manganese in the form of its manganous ion, which is in its second oxidation state, as $Mn^{+2}$, generally referred to as "manganese (II)" or "Mn (II)". Soluble manganese, as this term is used herein, does not exclude other forms of manganese that may be dissolved or soluble in a given aqueous system. The criterion for "soluble manganese" employed below is that detectable by atomic absorption in solutions that have been filtered through 0.45 micron Millipore filters, and the amount of such soluble manganese is generally expressed in terms of concentration thereof, typically in ppm. While this pore size was chosen for convenience, it was observed that filtration of sample solutions through filters of successively small poor size (0.45, 0.10, 0.025 micron) did not significantly reduce the concentration of soluble manganese determined thereafter by atomic absorption.

In subsequent discussions, the term "halogen species" refers to those forms of halogen as they exist in aqueous systems, including, but not limited to, hypohalous (HOBr, HOCl) and hypohalite salts ($M(OCl)_2$, $M(OBr)_n$ where M=Na, Ca, K, Li, and n=1,2) as they exist in equilibrium. Such species may result from the introduction of halogen in any of several forms, including, but not limited to, gaseous chlorine, sodium hypochlorite solutions (bleach), inorganic bromide salts in contact with chlorine-containing oxidants, or solid calcium hypochlorite.

The phrase "stabilization of soluble manganese" as used herein means the reduction of manganese deposits or precipitates formed in situ in an aqueous system in the presence of a halogen species, regardless of the form of such manganese deposits or precipitates, and regardless of the mechanism by which such deposits or precipitates are prevented or reduced. The stabilization of soluble manganese demonstrated below may ensue because, in the present process, manganese (II) is not oxidized to insoluble manganese species, such as $MnO_2$, or the mechanism may be in whole or part other than prevention of Mn (II) oxidation. The mechanism may be one of inhibition of incipient precipitate, and/or solubilization other than by preventing oxidation, and/or other mechanisms not yet determined in the art. Hence the form of the stabilized manganese is not necessarily the Mn (II) ion.

DISCLOSURE OF THE INVENTION

The present invention provides a process for the stabilization of soluble manganese in the waters of aqueous systems in the presence of halogen species which comprises adding to such waters an effective amount of certain water-soluble, nitrogen containing compositions, which compositions have the chemical structure of general Formula I:

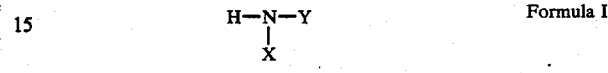

Formula I and are further defined as:

(a) sulfamic acid and the water-soluble alkali metal, ammonia, and amine salts thereof (one of X and Y being hydrogen, the other $-SO_3^-$);

(b) water-soluble nonaromatic primary amines (one of X and Y being hydrogen, the other a hydrocarbon radical);

(c) water-soluble nonaromatic secondary amines (each of X and Y being a hydrocarbon radical, including forming together with the N of Formula I a (poly)-heterocyclic ring structure); and (d) water-soluble amides wherein both X and Y include carbonyl radicals flanking the :NH thereof, particularly when within a ring structure.

PREFERRED EMBODIMENTS OF THE INVENTION

In preferred embodiment, such water-soluble, nitrogen containing compositions are added to the waters of aqueous systems in an amount of at least one equivalent, based on the nitrogen-moiety of Formula I as defined above, for each 4 moles of residual halogen present in such waters. By "residual halogen", "residual bromine" and "residual chlorine" is meant herein the concentrations of such halogen species that can be detected in the water by analytical methods, such as amperometric titration or DPD-FAS titration (standard water analysis). Such concentrations are expressed in the standard units employed in these methods, ppm $Cl_2$, reflecting the ability of the oxidant to react to titrant. The residual concentration is not directly an indication of the amount of halogen which is introduced into the system in order to produce such a residual concentration, since the available halogen concentration is affected by volatilization and decomposition of halogen species in the water, as well as demand by the system.

In further preferred embodiment the aqueous systems are industrial aqueous systems, such as cooling towers and boiler systems and the like, and the waters thereof are industrial process waters.

In another preferred embodiment of the invention the stabilizer of the present invention is added to the waters of the aqueous system before the introduction thereto of the halogen species.

As to the (b) category of the stabilizers of Formula I, the hydrocarbon radical may be straight chained, branched chained, in whole or part form a cyclic structure, and may be unsubstituted or substituted with (poly)alkoxy, (poly)hydroxy, (poly)sulfo, further (poly)amino, and the like, and where applicable this category includes the water-soluble alkali metal, ammonia, and amine salts of such compositions. Included within this category are the n-alkylamines types, that is, methylamine, ethylamine, n-propylamine, n-butylamine, n-pentylamine (n-amylamine), and n-hexylamine, which group of amines is limited by the decreasing water-solubility with increasing chain length to those amines with a hydrocarbon radical having from 1 to 6 carbon atoms. Also included in this category are primary amines having branched chains with respect to the amine moiety, including, without limitation, isopropylamine, sec-, iso-, and tert-butylamines, sec-, iso-, tert-amyl amines and amylamine (1-amino-2-methylbutane), and the like type of branched isomers, which group of amines is limited by the decreasing water-solubility with increasing chain length, offset to a degree by the carbon chain branching, to those amines with a hydrocarbon radical having from about 3 to 12 carbon atoms, although not all isomers within such range will have sufficient water-solubility. A third type of hydrocarbon radical chain structure of such primary amines is a cyclic structure with a pendant amine or alkylamine substituent, including, without limitation, cyclopropylamine, cyclobutylamine, cyclopentylamine, cyclohexylamine, cyclobutylmethylamine, and the like, which group of amines is limited by the decreasing water-solubility with increasing number of carbons to those amines with a hydrocarbon radical having from 3 to 8 carbons, although not all isomers within such range may have sufficient water-solubility. Regardless of which type of hydrocarbon chain structure embodied in the primary amine, such compositions may be further substituted with alkoxy, such as ethoxypropylamine and methoxypropylamine, or polyalkoxy, such as methoxyethoxybutylamine, or with (poly)hydroxy, such as monoethanolamine and 1-amino-2,3-propanediol, or with (poly)sulfo, such as taurine, or with further (poly)amino, such as ethylenediamine, or with other substituents such as the carboxy of alanine, or with diverse such substituents such as 1,3-diamino-2-propanol. It will be apparent to those of ordinary skill in the art that the number of compounds within such limitation is too numerous to practically enumerate, and further that upon further substitution the limitations given above for hydrocarbon radicals having no substitution, other than the primary amine of Formula I, with regard to water-solubility versus number of carbon atoms will no longer hold because of the effect of such substituents upon the water-solubility of a given composition. Hence for this category the defining characteristics are the presence of a primary amine and sufficient water-solubility to be used at the levels desired in the present process.

As to the (c) category of the stabilizers of Formula I, where X and Y are separately hydrocarbon radicals, such radicals may be independently straight chained or branched, of the same or of differing number of carbon atoms, including, without limitation, the methylbutylamine of the formula $CH_3(CH_2)_3NHCH_3$, the various isomers of dibutyl- and diamylamine, and the like. Further X and Y together may form a ring structure such as piperidine and 3-methylpiperidine (a five-carbon, one-nitrogen ring), or morpholine (a four-carbon, one-nitrogen, and one-oxygen ring). The various secondary amines may be further substituted such as described above for category (b)'s primary amines, and similarly may contain more than a single secondary amine moiety, such as piperazine (a four-carbon, two-secondary amine nitrogen ring) and cyclam (1,4,8,11-tetraazocyclotetradecane, having four secondary amines). Like category (b) discussed above, characteristics of this category are the presence of at least one secondary amine moiety and sufficient water-solubility to be soluble at the desired level for the process of the present invention.

The division into two categories of the primary and secondary amines does not exclude compositions, such as diethylenetriamine, with both primary and secondary amines.

As to the (d) category of the stabilizers of Formula I, where both X and Y have carbonyl radicals, that is have together with the :N-H of Formula I the chemical structure of Formula II:

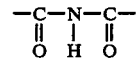   Formula II which moiety may be incorporated into an otherwise hydrocarbon straight or branched chain or into a heterocyclic ring structure such as isocyanuric acid, or hydantoin.

Such stabilizers may be used separately or in mixtures of a plurality of such stabilizer species.

In the subsequently examples the efficacy of a wide diversity of stabilizers within Formula I, and from each category thereof, is demonstrated by the following Examples 1 to 29, which are all working examples with actual test data.

In further preferred embodiment the stabilizer of the present invention is more narrowly defined as the stabilizer of Formula I above as defined by the categories (a), (b), and (c) above. That is, the stabilizer of the present invention is preferably sulfamic acid and water-soluble primary and secondary amines, and where applicable the water-soluble alkali metal, ammonia, and amine salts thereof.

EXAMPLE 1

The efficacy of sulfamic acid in suppressing the oxidation of Mn(II) by chlorine species in water was determined in the laboratory in the following manner. Synthetic cooling water containing 2 ppm Mn(II) was prepared with the pH adjusted to 8.5 with dilute NaOH. To inhibit $CaCO_3$ precipitation from the samples, 1-phosphonobutane-1,2,4-tricarboxylic acid ("PBTC") was included in the synthetic cooling water. The composition of this solution was as follows.

| | |
|---|---|
| Calcium: | 360 ppm (as $CaCO_3$) |
| Magnesium: | 200 ppm (as $CaCO_3$) |
| Bicarbonate: | 300 ppm (as $CaCO_3$) |
| Mn(II): | 2 ppm (as Mn) |
| PBTC: | 10 ppm (actives) |
| (pH: | 8.5) |

Aliquots of this solution were dispensed into amber bottles. Various dosages of sulfamic acid (ppm as $Cl_2$) were added, followed by the introduction of NaOCl with initial concentrations as set forth in Table I below. The samples were capped and stored at ambient room temperature for 40 hours, after which the aliquots were each filtered through 0.45 micron Millipore Type HA filters. The filtrates ("samples") were analyzed by atomic absorption to determine the concentration of soluble manganese in each. The percent oxidation of Mn(II) for each sample that was treated with sulfamic acid to suppress oxidation by chlorine species was determined by comparison to the concentration of soluble manganese in each to reference samples that were likewise processed but without sulfamic acid or NaOCl (samples 1a and 1b). The calculation of the percent oxidation is by the following, wherein "x" is the concentration (ppm) of soluble manganese in the reference sample, and "y" is the concentration (ppm) of soluble manganese in the sample question.

$$\frac{(x-y)}{x} \times 100 = \text{percent oxidation}$$

The results of these tests, and the dosages of NaOCl and sulfamic acid added to each aliquot are set forth in Table I below.

TABLE I

| Sample | Dosages (ppm) NaOCl | Sulfamic acid | Soluble Mn (ppm) | Percent Oxidation |
|---|---|---|---|---|
| 1a | none | none | 1.75 | — |
| 1b | none | none | 1.70 | — |
| 2 | 6 | none | .01 | 99 |
| 3 | 6 | 1.5 | .51 | 71 |
| 4 | 6 | 3.0 | 1.12 | 37 |
| 5 | 6 | 6.0 | 1.37 | 23 |
| 6 | 6 | 12.0 | 1.54 | 13 |

As shown in Table I, the blank (sample 2 with no sulfamic acid) provided conditions under with almost no soluble Mn survived.

EXAMPLE 2

The efficacy of sulfamic acid in suppressing the oxidation of Mn(II) was determined again under more severe conditions. The test method of Example 1 generally was used, with the following changes. No PBTC was added to the synthetic cooling water. The NaOCl charge was increased to 12 ppm. The sulfamic acid treatment was tested only at a level of 12.4 ppm sulfamic acid. A reference sample (sample 1) with no sulfamic acid or NaOCl was run, as was a blank (sample 2) to which was added the NaOCl but no sulfamic acid. In addition, a sample (sample 3) was included to which was added sulfamic acid but no NaOCl. Further, the filtration and atomic absorption determinations were made after both 16 and 110 hours. The test results are set forth in Table II below.

TABLE II

| Sample | Dosages (ppm) NaOCl | Sulfamic acid | Soluble Mn (ppm) 16 hours | 110 hours |
|---|---|---|---|---|
| 1 | none | none | 1.81 | 1.82 |
| 2 | 12.0 | none | 0.01 | (not tested) |
| 3 | none | 12.4 | 1.78 | (not tested) |
| 4 | 12.0 | 12.4 | 1.62 | 0.65 |

EXAMPLE 3

One interesting feature of the present invention is that the suppression of the oxidation of manganese (II) by halogen species with a sulfamic acid treatment is greater in the presence of typical cooling water alkalinity and hardness than in deionized water. To demonstrate this phenominon, the test method of Example 2 above was used with the following changes. Sulfamic acid was tested in the synthetic ("Syn.") cooling water at levels of from 1.5 to 12.0 ppm, together with a reference sample (sample 4) and blank (sample 6). In addition, sulfamic acid was tested at the level of 6 ppm in deionized (DI) water and for comparison a DI water reference (sample 1) and blank (sample 2) were also run. Most samples were filtered and tested by atomic absorption after both 20 and 44 hours. The test results are set forth below in Table III.

TABLE III

| Sample | Water | Dosages (ppm) NaOCL | Sulfamic acid | Soluble Mn (ppm) 20 hours | 44 hours |
|---|---|---|---|---|---|
| 1 | DI | none | none | 1.63 | 1.70 |
| 2 | DI | 6 | none | 0.01 | 0.00 |
| 3 | DI | 6 | 6 | 0.30 | 0.35 |
| 4 | Syn. | none | none | 1.60 | (not tested) |
| 5 | Syn. | none | 12 | 1.60 | 1.30 |
| 6 | Syn. | 6 | none | 0.01 | 0.00 |
| 7 | Syn. | 6 | 1.5 | 0.90 | 0.65 |
| 8 | Syn. | 6 | 3 | 1.40 | 1.02 |
| 9 | Syn. | 6 | 6 | 1.40 | 1.00 |
| 10 | Syn. | 6 | 12 | 1.50 | 1.25 |

EXAMPLE 4

The test described in Example 1 above was repeated except that, employing the procedure for in situ generation of the bromine species described in U.S. Patent No. 4,451,376 (J. Sharp), the disclosures of which is incorporated herein by reference, NaBr (1.5 ppm as $Cl_2$) was added to the test aliquots prior to the addition of NaOCl (6 ppm as $Cl_2$). As described in Example 1, the synthetic cooling water solution contained 10 ppm PBTC and the aliquots were filtered and resultant filtrate samples analyzed by atomic absorption for soluble Mn concentration after 40 hours. The test results, including that for the reference and blank samples, and the calculated percent oxidation, are set forth below in Table IV.

TABLE IV

| Sample | Dosages (ppm) NaOCl | NaBr | Sulfamic Acid | Soluble Mn (ppm) | Percent Oxidation |
|---|---|---|---|---|---|
| 1 | none | none | none | 1.90 | — |
| 2 | 6 | none | none | 0.00 | 100 |
| 3 | 6 | none | 6 | 1.50 | 21 |
| 4 | 6 | 1.5 | none | 0.00 | 100 |
| 5 | 6 | 1.5 | 6 | 1.60 | 16 |

EXAMPLES 5 TO 11

The test procedure described in Example 2 above was used to determine the efficacy of various amines. In each aliquot run, a dosage of 6 ppm NaOCl was added and, except for the blank (no amine added), equimolar amounts of the amine compound. The filtration and determination of filtrate soluble manganese was conducted at both 18 and 40 hours. The identities of the amines tested and test results are set forth below in Table V.

TABLE V

| Example | Amine Stabilizer | Soluble Mn (ppm) 18 hours | 40 hours |
|---|---|---|---|
| 5 | hydantoin | 1.66 | 1.46 |
| 6 | isocyanuric acid | 1.46 | 0.90 |
| 7 | tris(hydroxymethyl) aminomethane | 1.72 | 1.70 |
| 8 | 3-methylpiperidine | 1.68 | 1.50 |
| 9 | piperazine | 1.80 | 1.75 |
| 10 | morpholine | 1.80 | 1.80 |
| 11 | sulfamic acid | 1.75 | 1.59 |
| blank | none | 1.20 | 0.45 |

EXAMPLES 12 TO 20

The test procedure described in Example 1 above was used to determine the efficacy of various amines in the process of the present invention. In each aliquot run a dosage of 6 ppm NaOCl (as $Cl_2$) and equimolar amounts of the amine compound were added, except for the blank, which contained no amine, and the standard, which contained neither the NaOCl nor amine. The amount of stabilized manganese remaining in the filtrate after filtration through a 0.45 micron Millipore type filter was determined after both 18 hours and 42 hours. The test results and identity of the amines tested are set forth below in Table VI.

TABLE VI

| Example | Amine Stabilizer | Stabilized Mn (ppm) 18 hours | 42 hours |
|---|---|---|---|
| Standard | none | 2.0 | 1.9 |
| 12 | n-butylamine | 2.0 | 1.9 |
| 13 | t-butylamine | 2.0 | 1.9 |
| 14 | N-methylbutylamine | 1.8 | 1.7 |
| 15 | diethylenetriamine | 2.0 | 1.8 |
| 16 | cyclohexylamine | 2.0 | 1.9 |
| 17 | methoxypropylamine | 2.0 | 1.9 |
| 18 | monoethanol amine | 2.0 | 1.9 |
| 19 | taurine | 2.0 | 1.9 |
| 20 | cyclam | 1.9 | 1.8 |
| blank | none | 1.2 | 0.1 |

EXAMPLES 21 TO 29

The test procedure described in Example 4 above was used to determine the efficacy of the various amines of Examples 12 to 20 in the presence of bromine. The levels of the NaBr, NaOCl, and stabilizer were the same as in Example 4, and samples were taken, filtered through a 0.45 micron Millipore type filter, and analyzed by atomic absorption after 18 and 42 hours. In addition to the example aliquots, a blank without any stabilizer and a standard without any stabilizer or oxidant were run. The test results and identity of the amine are set forth below in Table VII.

TABLE VII

| Example | Amine Stabilizer | Stabilized Mn (ppm) 18 hours | 42 hours |
|---|---|---|---|
| Standard | none | 2.0 | 1.9 |
| 21 | n-butylamine | 1.9 | 1.8 |
| 22 | t-butylamine | 1.7 | 1.6 |
| 23 | N-methylbutylamine | 1.8 | 1.7 |
| 24 | diethylenetriamine | 1.7 | 1.4 |
| 25 | cyclohexylamine | 1.9 | 1.8 |
| 26 | methoxypropylamine | 1.9 | 1.8 |
| 27 | monoethanol amine | 1.9 | 1.7 |
| 28 | taurine | 1.9 | 1.7 |
| 29 | cyclam | 1.6 | 1.5 |
| blank | none | 0.0 | 0.0 |

INDUSTRIAL APPLICABILITY OF THE INVENTION

The present invention is applicable to those industries employing process waters in aqueous systems, including cooling towers, industrial boiler systems, and the like.

We claim:

1. A method of stabilizing soluble manganese by the reduction of manganese deposits or precipitates formed in situ in the waters of aqueous systems in the presence of an effective amount of halogen species to control microbiological growth in said aqueous systems comprising:

adding to said waters an effective amount of a water-soluble, nitrogen containing composition, said composition having the general chemical structure of Formula I:

  Formula I and is further defined as:
(a) sulfamic acid and the water-soluble alkali metal, ammonia, and amine salts thereof, wherein one of X and Y is hydrogen, the other being $-SO_3^-$;
(b) water-soluble nonaromatic primary amines, wherein one of X and Y is hydrogen, the other being a hydrocarbon radical;
(c) water-soluble nonaromatic secondary amines, wherein each of X and Y is a hydrocarbon radical; and
(d) water-soluble amides which include the moiety of Formula II wherein both X and Y have carbonyl radicals:

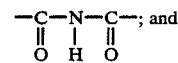 Formula II mixtures thereof.

2. The method of claim 1 wherein said water-soluble, nitrogen containing composition is added to said waters in an amunt of at least one equivalent, based on the nitrogen-moiety of said Formula I, for each 4 moles of residual halogen.

3. The method of claim 1 wherein said waters are industrial process waters of an industrial aqueous system.

4. The method of claim 1 wherein said water-soluble, nitrogen containing composition is added to said waters prior to the introduction of said halogen species.

5. The method of claim 1 wherein said halogen species is chlorine in the form in which it exists in aqueous systems.

6. The method of claim 1 wherein said halogen species at least includes bromine in the form in which it exists in aqueous systems.

7. The method of claim 1 wherein said water-soluble, nitrogen containing composition is sulfamic acid, a nonaromatic primary or secondary amine, water-soluble alkali metal, ammonia, or amine salts thereof, and mixtures thereof.

* * * * *

UNITED STATES PATENT AND TRADEMARK OFFICE
CERTIFICATE OF CORRECTION

PATENT NO. : 4,883,600
DATED      : Nov. 28, 1989
INVENTOR(S) : James R. MacDonald and Barbara E. Fair It is certified that error appears in the above-identified patent and that said Letters Patent is hereby corrected as shown below:

In Column 1, line 47, delete " $(M(OCl)_2$ " and substitute therefor -- $(M(OCl)_n$ --.

In Column 4, line 26, delete " subsequently " and substitute therefor -- subsequent --.

Signed and Sealed this

Twenty-third Day of October, 1990

Attest:

HARRY F. MANBECK, JR.

*Attesting Officer*    *Commissioner of Patents and Trademarks*